United States Patent [19]

Jones et al.

[11] Patent Number: 4,638,972

[45] Date of Patent: Jan. 27, 1987

[54] VALVE APPARATUS

[75] Inventors: Marvin R. Jones; Paul E. Helfer, both of Houston, Tex.

[73] Assignee: Koomey, Houston, Tex.

[21] Appl. No.: 756,187

[22] Filed: Jul. 18, 1985

[51] Int. Cl.⁴ ............................................. E21B 33/06
[52] U.S. Cl. ....................................... 251/1.3; 251/77; 277/188 A
[58] Field of Search ............................ 251/1.2, 1.3, 77; 277/180, 188 A, 188 R, 209

[56] References Cited

U.S. PATENT DOCUMENTS

| | | | |
|---|---|---|---|
| 1,064,660 | 6/1913 | Klee | 251/84 |
| 2,349,170 | 5/1944 | Jackman | 277/188 A |
| 2,717,793 | 9/1955 | Nenzell | 277/180 |
| 3,366,392 | 1/1968 | Kennel | 277/188 R |
| 4,265,424 | 5/1981 | Jones | 251/1.3 |
| 4,488,703 | 12/1984 | Jones | 251/1.3 |
| 4,582,293 | 4/1986 | Jones | 251/1.3 |
| 4,589,625 | 5/1986 | Jones | 251/1.3 |

*Primary Examiner*—Martin P. Schwadron
*Assistant Examiner*—Sheri M. Novack
*Attorney, Agent, or Firm*—Vaden, Eickenroht, Thompson & Boulware

[57] ABSTRACT

There is disclosed a blowout preventer used in the drilling and completion of oil and gas wells and having rams which are moved within chambers in a housing which intersect a bore therethrough between positions opening and closing the bore. The zones of the bore above and below the closed rams are respectively connected by first and second passageway means with the outer side of the rams, with one of the passageway means extending through each ram. Each ram is moved by operating means which includes a rod having a lost motion therewith and a packing assembly on its inner end which sealably engages an end surface of the ram which surrounds the opening of the one passageway means to the chamber, as the rod moves inwardly to close the rams, and disengages therefrom, as the rod moves outwardly to open the rams.

9 Claims, 9 Drawing Figures

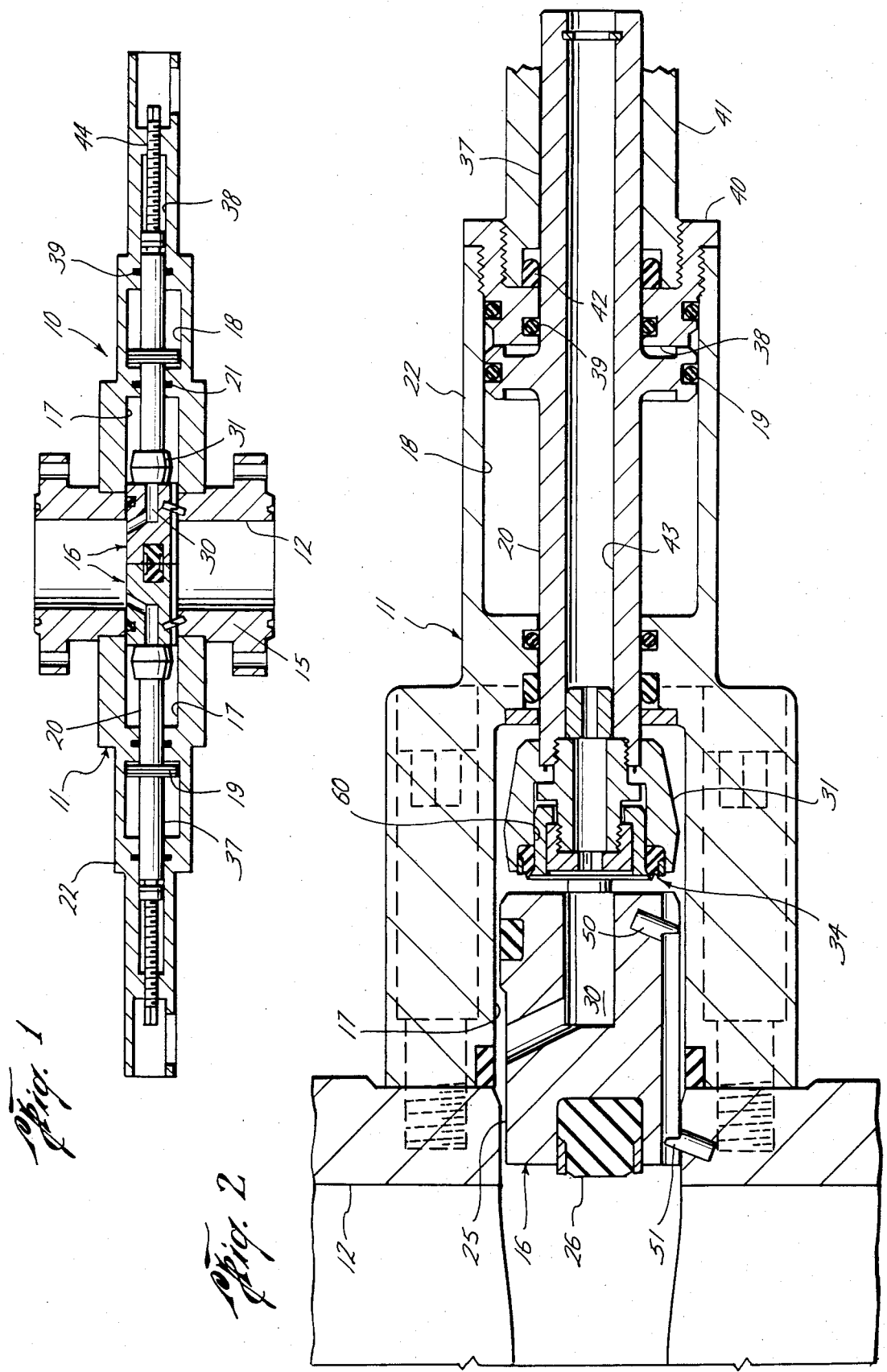

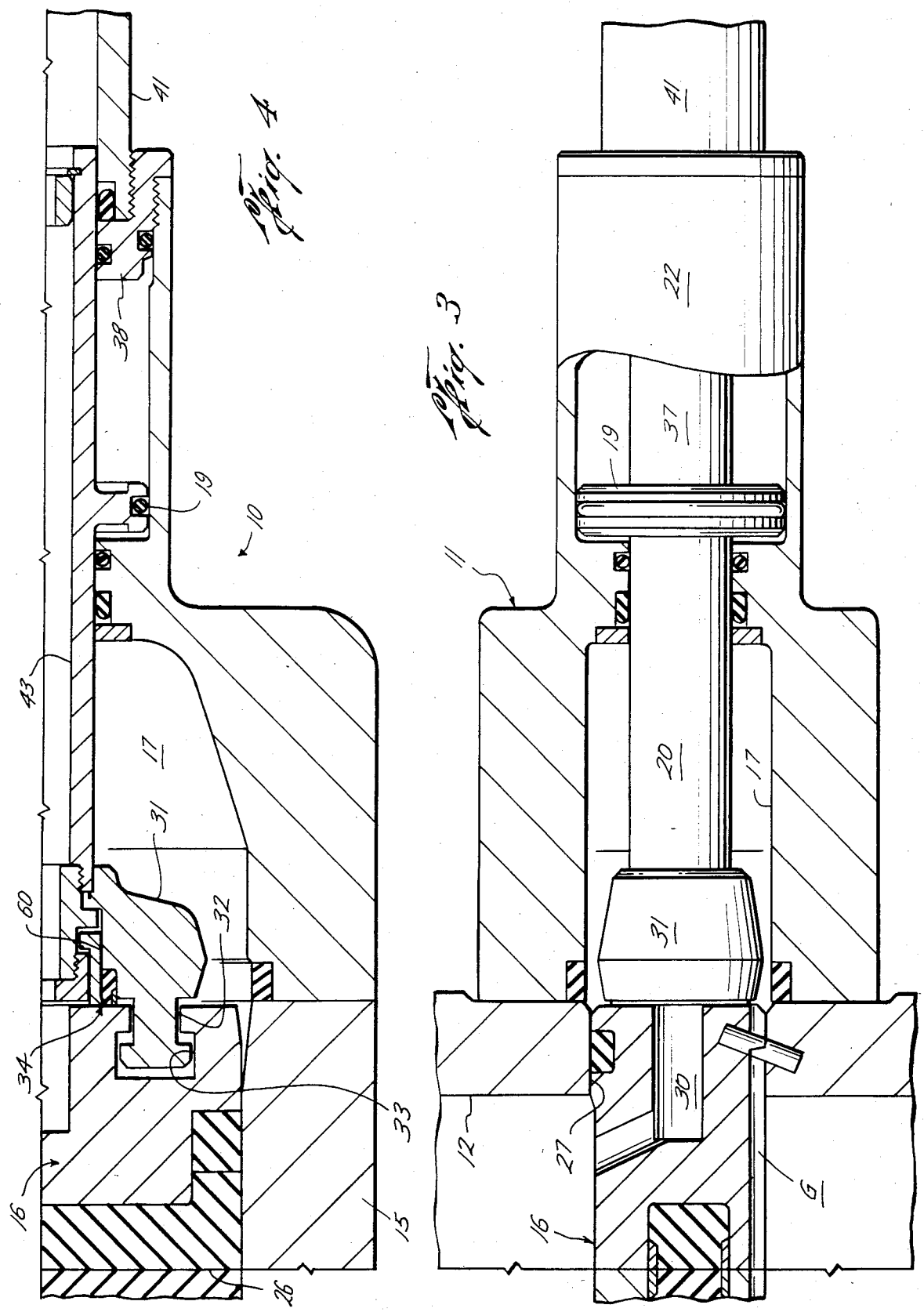

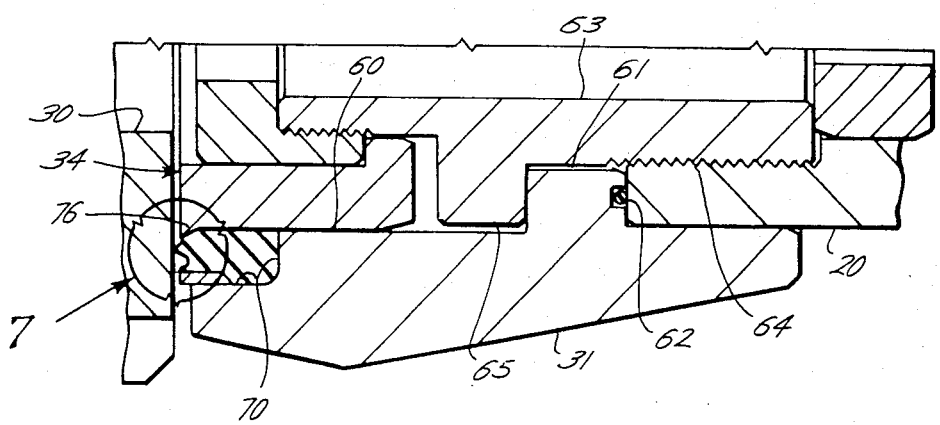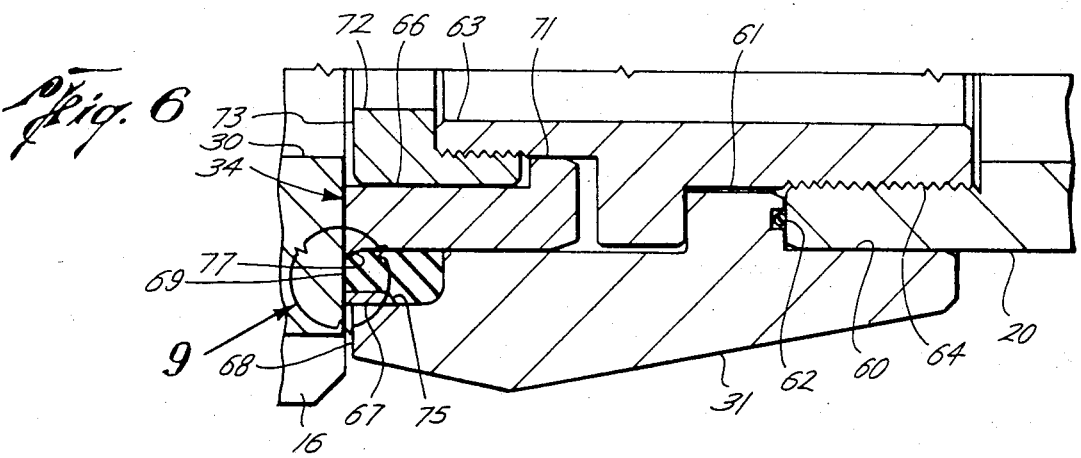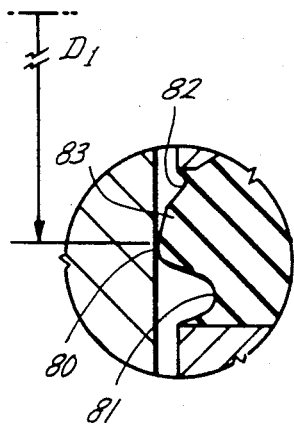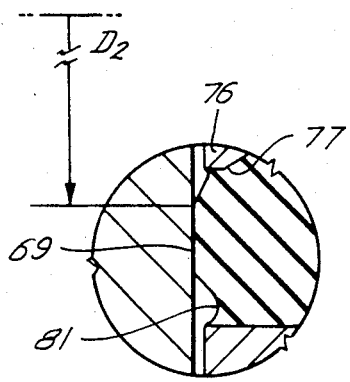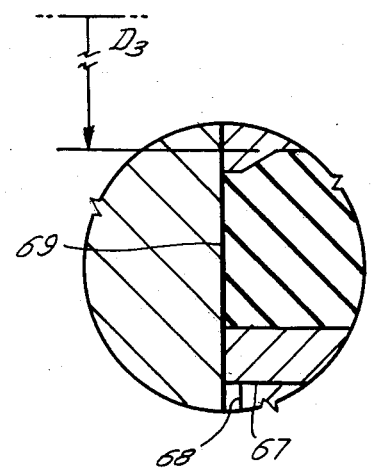

VALVE APPARATUS

This invention relates generally to valve apparatus, and especially to double gated valves, such as blowout preventers used in the drilling and completion of oil and gas wells, wherein the closure member of the valve apparatus, or the double gates or rams, are caused to move within chambers in a housing which intersect a bore therethrough between positions opening and closing the bore. More particularly, it relates to improvements in such valve apparatus, and especially blowout preventers or other double gated valves, in which the zones of the bore above and below the closure member or rams, when closed, are respectively connected by first and second passageway means, with the outer side of the closure member or at least one of the rams, and wherein one of the passageway means extends through the closure member or the one ram, and the closure member or one ram is so moved by operating means which includes a rod having a lost motion therewith and a packing assembly on its inner end which sealably engages an end surface of the closure member or one ram which surrounds the opening of the one passageway means to the chamber, as the rod moves inwardly to close the closure member or one ram, and disengages therefrom, as the rod moves outwardly to open the closure member or one ram. Thus, as shown and described in a co-pending application, Ser. No. 337,383, filed Jan. 6, 1982, now U.S. Pat. No. 4,582,293 and entitled "Hydraulically Operated Valves", which application is assigned to the assignee of the present application, rams of a blowout prevent of this general construction are held in closed position not only by the operating means, but also by a force due to the pressure of well fluid from one zone acting over the outer ends of the rams. However, when the rods are moved outwardly to open the rams, that pressure is vented to the other zone so as to lessen the force required to open the rams as they are moved outwardly with its rod.

In the blowout preventer of the above mentioned co-pending application, the packing assembly comprises inner and outer metal rings which are carried on the inner end of each rod for axial movement with respect thereto and whose outer ends protrude from the surrounding end surface of the inner end of the rod, and a ring of elastomeric material having its inner and outer diameters and outer end confined between the metal rings and by a recess in the inner end of the rod. Thus, upon inward movement of the rods to close the rams, the inner ends of the elastomeric ring and metal rings are engaged with the end surface of the ram to which the rod is connected to deform the elastomeric into tight engagement therewith as metal rings move outwardly with respect to the rod, the engagement of the inner ends of the metal rings with the end surface of the ram preventing the elastomeric material from being extruded between them and the end surface of the ram. More particularly, the outer metal ring has an end surface opposite a confronting surface on the elastic ring so that deformation of the elastomeric ring urges the inner end of the outer ring into even tighter engagement with the end surface of the ram.

In the illustrated assembly, the metal rings are bonded to the elastomeric rings, the outer end of the rings extends within an elongated recess in the rod, and the assembly is mounted on the rod by snap rings on the rod which are received within grooves in the inner diameter of the inner metal ring to permit the inner metal ring to move outwardly in the elongated recess as the elastomeric ring is deformed. Upon release of the snap rings, a worn or otherwise damaged packing assembly may be replaced for repair or replacement.

More particularly, the inner diameter of the elastomeric ring subtends an area somewhat larger than that of the portion of the rod which extends sealably through a hole in the housing at the outer end of the ram chamber. As a result, when the packing assembly is sealably engaged with the end surface of the ram, well fluid in the chamber provides a force which urges the elastomeric ring into tighter sealing engagement therewith.

It has been found, however, that slight leakage may occur across the packing assembly when the pressure of well fluid is relatively low. This is believed to result from the low force developed by the low well pressure and its inability to deform the elastomeric ring as well as to overcome frictional resistance in the operating means. Thus, when the pressure of the well fluid is relatively low, friction due to the sliding of the rod sealably through a hole in the housings, and the piston on the rod within the cylinder in the case of an hydraulic operator, provides a force resisting that urging the rod inwardly which is proportionately a greater factor than it is when the pressure of the well fluid is relatively high.

One solution to this problem would be to increase the area subtended by the inner diameter of the elastomeric ring, and thus the force due to the well fluid with which the inner end of the elastomeric ring is urged against the end of the ram. However, this would tend to produce undesirably high engagement pressures between the ring and end surface which, at rated working pressures, may seriously shorten the useful life of the packing assembly. It is therefore the primary object of this invention to provide a blowout preventer or other valve apparatus of the type described wherein this tendency for leakage between the packing assembly and ram at low pressures may be overcome without inducing undesirably high engagement pressures in the elastomeric ring, and, more particularly, in which this may be accomplished with only a relatively minor modification of the packing assembly itself.

This and other objects are accomplished in accordance with the illustrated embodiment of the invention by a blowout preventer of the type described in which the packing assembly thereof is of such construction that the area of the elastomeric ring over which well fluid is effective is much larger when the pressure of the well fluid is relatively low than it is when the pressure thereof is relatively low. For this purpose, and in accordance with the preferred embodiment of the invention, the packing assembly comprises, as in the prior packing assembly, inner and outer metal rings which are carried by the inner end of the rod for axial movement with respect thereto and whose inner ends protrude from the surrounding end surface of the rod, and a ring of elastomeric material having its inner and outer diameters and outer end confined between the metal rings and by a recess in the inner end of the rod. More particularly, the inner diameter of the elastomeric ring subtending an area greater than that of the portion of the operating rod which extends sealably through a hole in the housing leading to the operating means, whereby the pressure of well fluid in the chamber for the ram provides a force which urges the elastomeric ring against the end surface of the ram. Thus, in accordance with the novel aspects of the present invention, and as compared with the prior packing assembly, the elastomeric ring has an annular ridge on its inner end which protrudes from the adjacent end surfaces of the inner and outer metal rings for sealable engagement with and disengagement from the end surface of the ram, in response to outward and inward movement of the rod, respectively, and the inner end of the packing assembly has an annular recess which surrounds the ridge and into which a volume of elastomeric material equivalent to that of the ridge may move as the ridge is deformed upon continued inward movement of the rod. More particularly, the radially inner side of the ridge is generally frusto-conically shaped, so that, as the ridge first engages the ram surface, well fluid acts over an area subtended by the outer diameter of the surface, and, as the pressure of the well fluid increases, the packing assembly is moved inwardly to flatten the ridge so as to decrease area over which well fluid is effective, and thus the force with which the packing assembly is urged against the end surface of the ram is lessened. As the ridge is deformed, elastomeric material of the ring moves into the recess and thus is not extruded between the metal rings and ram surface.

As in the prior assembly, the outer metal ring has an end surface opposite a confronting surface on the elastomeric rings, and, in accordance with a further novel aspect of the invention, the outer diameter of the inner metal ring has an annular flange on its inner end which has an outer surface confronting a surface on the inner end of the inner diameter of the elastomeric ring. Hence, deformation of the elastomeric ring urges the inner ends of both metal rings toward the end surface of the ram.

In the drawings, wherein like reference characters are used throughout to designate like parts:

FIG. 1 is a vertical sectional view of a ram-type blowout preventer constructed in accordance with the present invention, and with the rams thereof moved inwardly within chambers formed in the preventer housing to close the bore of the preventer housing with which the chambers intersect, FIG. 2 is an enlarged vertical sectional view of one side of the preventer of FIG. 1, with the ram in such one side moved to open position, and with the packing assembly on the inner end of the operating rod for so moving the ram spaced from the surface on the outer end of the ram surrounding the opening of a passageway through the ram which connects the zone above the closed rams with the chamber on the outer end of the ram;

FIG. 3 is a view similar to FIG. 2, upon movement of the rod inwardly to move the packing assembly into engagement with the end surface of the ram and move the ram to closed position:

FIG. 4 is a horizontal sectional view of the one side of the preventer, with the rams moved to closed positions and the packing assembly sealably engaged with the ram;

FIG. 5 is an enlarged sectional view of the outer end of the ram and inner end of the rod with the packing assembly urged against the outer end of the ram by relatively low well pressure:

FIG. 6 is a view similar to FIG. 5 but with the packing assembly urged against the ram by higher well pressure; and FIGS. 7 to 9 are enlarged detailed sectional views of the progressive engagement of the ridge of the elastomeric ring with the end surface of the ram as the pressure of well fluid increases.

With reference now to the details of the above-described drawings, the preventer shown in FIG. 1 and indicated in its entirety by reference character 10, comprises a housing 11 having a vertical bore 12 therethrough and adapted to be connected at the head of a well. As shown, the bore is empty, although during the drilling of a well, a pipe may extend through the bore of the preventer. Ordinarily, this pipe would be a drill pipe through which drilling fluid may be circulated downwardly into the well bore and then returned upwardly within the annulus between the pipe and the bore of the preventer. Also, of course, two or more preventers may be stacked one above the other at the wellhead.

The preventer also includes a pair of rams 16 which are received within chambers 17 intersecting opposite sides of the housing bore 12. As above described, the rams are adapted to be moved within the chambers between outer positions in which they are withdrawn into their chambers so as to open the bore (FIG. 2), and inner positions which they engage with one another in order to close the bore (FIG. 1). As shown, the rams are of the "blind" type having flat inner ends for sealing with one another. However, when the rams are to close about a pipe in the bore, grooves are formed in the inner ends to seal thereabout. In either event, and as will be understood, with the rams closed, the pressure of well fluid in the zone of the bore beneath them may be quite high as compared with the zone in the bore above them.

Each ram is moved between opened and closed position by means of operating means compressing a cylinder 18 formed in the housing outwardly of each ram chamber, a piston 19 reciprocable within the cylinder, and a rod 20 connected to the ram and extending from the piston and sealably through a packing 21 carried within an opening through a wall of the housing separating the ram chamber from the cylinder for connection with the ram. As will be understood, hydraulic fluid from an external source may be supplied to or exhausted from the cylinder on opposite sides of the piston for reciprocating the piston and thus moving the ram toward and away from the bore.

Each housing 11 comprises a main body 15 in which are formed the bore 12 of the housing and the inner end of the chamber 17 in which each rams are received. The housing also includes a pair of bonnets 22 each releasably connected to one side to the main body 21 and having the cylinder 18 of the ram operating system formed in its outer end outwardly of the outer end of the ram chamber which is aligned with the inner end of the chamber when the bonnets are in closed position.

Each ram comprises a metallic ram body 25 of generally oval cross section, and packing of rubber-like material carried by the ram body for sealing with respect to the other ram as well as with respect to the chamber 17 in the preventer housing so as to form a continuous seal for closing the bore. More particularly, the packing includes a front face portion 26 having rear extensions on each side and received closely within a recess extending across the front and sides of the ram body 25, and a top portion 27 which is received with a recess over the top side of the ram body which extends from one side to the other of the side extensions of the front face packing to circumscribe an area across the upper front face and front end of the top of the ram which is exposed to well pressure in the zone above the rams when closed.

Each ram body 25 is provided with a groove G in its lower side which connects the bore of the housing on its inner end with the chamber 17 on the outer end of the ram. Thus, with the rams closed, the pressure of the well fluid within the zone of the bore of the preventer above the closed rams acting over the area on its inner top side and upper front face circumscribed by the continuous packing is relatively low, as compared with the well pressure in the zone below the closed rams and thus in the chamber behind the rams, so that with the rams moved to closed position, well fluid pressure provides a force in addition to that of operating fluid to hold the rams in such positions.

A passageway 30 is formed in the ram body to connect its outer end with the upper end portion thereof circumscribed within the continuous packing so as to connect the ram chamber 17 with the upper zone of the bore of the preventer above the closed rams. As shown in FIG. 3, for example, the passageway 30 is made up of a central bore which opens to the outer end of the ram in axial alignment with piston rod 20, and one or more upwardly and inwardly extending branches which connect with the top side of the ram generally intermediate its inner end and the top packing 27 extending thereacross.

The inner end of rod 20 within chamber 17 has an enlarged head 31 which extends laterally of the ram chamber (see FIG. 4) and has "T"'s 32 projecting from its inner end on each side of the rod for fitting within "T" slots 33 formed in the ram body on opposite sides of passageway 30. More particularly, slots 33 extend upwardly from the lower side of the ram body and terminate generally midway its upper and lower sides so that, with the bonnets retracted from the main body of the housing, and the rams moved inwardly, the rams may be connected with the rod 20 by lowering the "T" slots onto the "T"'s, and removed from the rod by lifting the "T" slots from the "T"'s. More particularly, the neck of each "T" 32 is longer than the reduced neck of the "T" slot 33, so that each "T", and thus the valve head and piston rod, have lost motion with respect to the ram.

An annular packing assembly 34 carried by the inner end of the valve head intermediate the "T"'s 32 and in axial alignment with rod 20 protrudes from the front end of the valve head 31 so as to be movable into engagement with a seating surface on the rear end of the ram body which surrounds the opening of passageway 30 to the chamber 17 on the outer end of the ram. Thus, as the rod is moved forwardly with respect to the ram, due to the lost motion connection between the rod and ram, packing assembly 34 will sealably engage the seating surface of the ram. Alternatively, when the rod is moved outwardly with respect to the ram to the extent of the lost motion connection, packing assembly 34 is disengaged from the seating surface so as to connect the ram chamber on the outer end of the ram with the zone of the bore of the housing above the closed rams.

Another rod 37 extends outwardly from piston 19 and sealably through a wall or reduced diameter portion of the housing separating cylinder 18 from an outer chamber 38 within the housing. Thus, a packing 39 is carried within a groove in a nut 40 forming the outer end of cylinder 18, and a closed end tubular member 41 is carried by and extends from the nut to form the chamber 38. Packing 42 may be carried within a groove in the inner end of the tubular member 41 to form an additional seal about the rod 37. Well fluid acting over the forward end of the rod 20 is admitted to the outer chamber 38 so as to act over the rear end of the rod 37 and thus counterbalance at least part of the force which would otherwise have to be overcome in opening the rams.

More particularly, a hole 43 is formed through both rods 20 and 37 as well as piston 19 so as to connect the inner end of rod 20 within packing 21 with the outer end of rod 37. Preferably, the above-described packings within which rods 21 and 37 are slidable are of equal diameter so that, with the valve head 31 moved outwardly with respect to the ram, as shown in FIG. 2, well fluid within the bore of the preventer is effective over equal areas on opposite ends of the rods to pressure balance same and thus eliminate any force tending to move the rod inwardly or outwardly.

As shown in FIG. 1, a lock screw 44 is mounted on the outer closed end of tubular member 41 of the housing for movement within outer chamber 38 between an outer position and the inner position of FIG. 4 in which it locks the rams in closed position. Inasmuch as the pressure within the chamber 38 into which the lock screw is moved is that of well fluid within the bore of the preventer above the closed rams, it provides relatively little resistance to inward movement of the lock screw.

Viewing now the overall operation of the preventer, and assuming that it is desired to move the rams from open position to closed position, hydraulic operating fluid is admitted to the cylinders 18 rearwardly of the pistons 19 and exhausted therefrom forwardly of the pistons to cause the operating rods 20 to move inwardly. As just described, inasmuch as the rods are pressure balanced, the force necessary for so moving the rods is merely that required to overcome the weight and frictional resistance of the rams, so that operating fluid requirements are minimized. In any event, due to the lost motion provided by the T's and T-slots on the valve head and ram, the rod first moves forwardly to engage packing assembly 34 carried by valve head 31 with the seating surface on the rear end of the ram surrounding the opening of passageway 30 to the chamber. Upon continued inward movement of the rod, the ram is moved inwardly until on its front face sealably engages that of the other ram to close the preventer bore. As shown, each ram front packing protrudes from the front face of the metallic ram body to not only seal with one another, but also cause the side packings and top packings of the rams to protrude into sealing engagement with the ram chambers. As previously described, with the rams in closed position, and packing assemblies engaged with the end surfaces of the rams, the relatively high pressure well fluid in the zone beneath the closed rams is effective over a substantial area of the rear ends of the rams to provide a force which supplements the closing force of operating fluid in maintaining the rams closed.

Pins 50 are press fitted into holes in the lower sides of the rams to dispose their lower ends in the groove G in the bottom of the ram, and pins 51 are press fitted into holes in the preventer housing with their upper ends extending into the same groove inwardly of pins 50. More particularly, an inwardly facing surface on the lower end of pin 50 and an outwardly facing surface of the upper end of pin 51 are so arranged as to engage and thereby prevent further inward movement of the right hand ram when the inner faces of the metallic body of the ram are disposed within a vertical plane passing through the axis of the preventer bore.

When it is desired to open the rams, operating fluid is admitted to the cylinders 18 on the inner sides of the pistons while being exhausted from the outer sides thereof so as to withdraw the rods. During initial outward movement of the rods, packing assembly 34 is lifted from the seating surface on the rear end of the ram so as to vent high pressure well fluid in the ram chamber behind the ram to the zone of the bore of the preventer housing above the closed rams. The cross-sectional area of each passageway 30 is substantially larger than the cross-sectional area of the groove G in the bottom of each ram which connects its inner end with the ram chamber, so that the high pressure well fluid is quickly vented from the chamber at the rear of each ram to cause a pressure differential across the ram to urge it open during initial withdrawal of the operating rod. The rams will of course continue to be withdrawn as piston 19 moves to its outermost position within the chamber 18, as shown in FIG. 2.

As best shown in FIGS. 2, 4, 5 and 6, the enlarged head 31 on the inner end of rod 20 has a cylindrical bore 60 therethrough and an annular flange 61 about the bore intermediate its inner and outer ends. The inner end of the rod 21 is received in the outer end of the bore 60 and sealed with respect thereto by means of O-ring 62 carried in a groove in the outer side of the flange 61 of the head 31. The head is releasably retained on the rod by means of a sleeve 63 whose outer end is threadedly connected at 64 to the threaded inner end of the rod 20. More particularly, the sleeve 63 has an annular flange 65 thereabout which is received within the inner end of the bore 60 in the enlarged head 31, as the sleeve is made up with rod 20, and which abuts the inner end of the flange 61 of the head 31 when the sleeve is threadedly connected to the rod 21 to thereby securely hold the head on the rod.

As previously described, and as best shown in FIGS. 5 and 6, packing assembly 34 includes inner and outer metal rings 66 and 67, respectively, each carried by the rod for axial movement with respect thereto and a seal ring 69 of elastomeric material which has its inner and outer diameters and its outer end confined between the metal rings and a recess 70 in the inner end of the bore 60 of the enlarged head 31 of the rod. As also previously described, the metal rings and the elastomeric ring are bonded to one another to provide an assembly which is adapted to be releasably mounted as a unit on the inner end of the rod in the position shown in FIGS. 5 and 6.

The outer diameter of the inner ring 66 is slidably received within the inner end of the bore 60 of the enlarged head 31 of the rod and has a flange 71 thereabout with its outer end spaced from the inner end of flange 65. The outer ring and thus the packing assembly as a unit is releasably held in place on the head of the rod by means of a nut 72 threaded to the inner end of sleeve 63 and closely received within the bore of ring 66 inwardly of annular flange 71 about the ring 66. Prior to engagement of the packing assembly with the end of the ram, the nut engages the flange 71 to hold the elastomeric ring 69 closely within recess 70.

The outer metal ring 67 has an outer end surface 75 which confronts an inwardly facing surface adjacent the outer diameter of the elastomeric ring 69. The inner metal ring 66, on the other hand, has a flange 76 about its outer diameter adjacent its inner end which has an outwardly facing conical surface 77 opposite a confronting surface of the elastomeric ring 69 adjacent the inner end of the outer diameter. The inner end of the head 31 and the inner end 73 of nut 72 are spaced rearwardly of the inner ends of the inner and outer metal rings so that the latter protrude therefrom. Thus, as previously described, and as will be understood from FIGS. 5 and 6, upon inward movement of the packing assembly with the rod, and with the inner ends of the metal rings with the end surface of the ram which surrounds the ram passageway 30, continued inward movement of the rod from the position of FIG. 5 to the position of FIG. 6 will cause both metal rings to move rearwardly, ring 67 within recess 70 and ring 66 within the annular recess between bore 60 in the head and nut 72. During this time, the metal rings are urged tightly against the ram surface due to the deformed elastomeric material acting against the confronting end surfaces, so as to confine the elastomeric ring against extrusion between their inner ends and the confronting end surface of the ram. As can be seen from comparison of FIGS. 5 and 6, this axially outward movement of the metal rings causes the flange 71 on the inner diameter of the metal ring 66 to move away from the outer end of the nut 72 and thus toward the inner end of the flange 65 about sleeve 63.

As also previously described, and as best shown in FIG. 7, the inner end of the elastomeric ring 69 has an annular ridge 80 which protrudes from the inner ends of the metal rings so as to initially engage the end surface of the ram as the rod is moved inwardly into the position of FIG. 5. More particularly, the elastomeric ring has an annular recess 81 formed therein in surrounding relation to the annular ridge 80 and of a volume which substantially equals that of the protruding ridge 80, so that deformation of the elastomeric ring, as the rod continues to be moved inwardly from the position of FIG. 7 to the position of FIG. 9, will substantially fill the recess 81. More particularly, another recess 82 is formed in the inner end of the elastomeric ring adjacent its intersection with the inner end of the metal ring 66. This recess is found to be useful in permitting the elastomeric material to be deformed without extruding into the space between the inner end of the metal ring 66 and the outer end surface of the ram before the inner end of the metal rings engage the end surface of the ram.

As shown, the annular ridge includes a conically shaped surface 83 which extends radially inwardly and axially outwardly between its innermost point and the recess 82. Thus, as the rod is moved inwardly to the position of FIG. 5, the annular ridge 80 will initially engage the end surface of the ram along the diameter D1, as shown in FIG. 7. If the well pressure is relatively low, it will not move the rod further inwardly substantially beyond the FIG. 5 position, and since the annular area subtended by diameter D1 is relatively large, the force due to tare friction on the rod resisting its inward movement will be overcome in order to maintain the packing assembly in sealing engagement with the outer end surface of the ram.

If, however, the pressure of the well fluid is greater, and thus provides a larger force to move the rod 21 and the packing assembly inwardly, the ridge is flattened to deform the elastomeric ring. As a result, and as shown in FIG. 8, the pressure fluid is effective over a small diameter D2 defined by the outer end of the unflattened portion of the conical surface. A further increase in the well fluid pressure will fully flatten the elastomeric ring as the inner ends of the metal rings engage the outer end surface of the ram, as shown in FIG. 9, so that the pressure of the well fluid is effective over a still smaller diameter D3. At this time, as shown in FIG. 6, the inner end surfaces 68 and 73 on the inner end of the rod are still spaced from the opposite end surface of the ram.

As shown in FIG. 8, initial deformation of the annular ridge 80 will cause a substantial reduction in the size of the recess 81, as well as the smaller annular recess 82. Consequently, when the packing assembly reaches the position of FIG. 9, the inner end surface of the elastomeric ring will be substantially flush with the inner end surfaces of the metal rings, both recesses 81 and 82 being substantially filled with the deformed elastomeric material, so that there is little or no risk of extruding the elastomeric material between the opposite end surfaces of the metal rings and ram.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A blowout preventer, comprising
   a housing having a bore therethrough and chambers which intersect the bore,
   rams reciprocable within the chambers between positions for opening the bore and positions engaged with one another for closing the bore to divide it into zones above and below the rams,
   means for so reciprocating each ram including a rod which extends sealably through the housing into the chamber and is connected to the ram for moving the ram inwardly with the rod to closed position and outwardly with the rod to open position,
   first and second passageway means for connecting the upper and lower zones of the bore, respectively, with the chamber behind at least one ram when the rams are closed,
   one of the passageway means extending through the one ram,
   the connection of said one ram to its rod having lost motion, and
   the rod for said one ram having a packing assembly thereon comprising
   inner and outer metal rings which are carried by the inner end of the rod for axial movement with respect thereto and whose inner ends protrude from the surrounding end surface of the inner end of the rod, and
   a ring of elastomeric material having its inner and outer diameters and outer end confined between said metal rings and by a recess in the inner end of the rod,
   the inner diameter of the elastomeric ring subtending an area greater than that of the portion of the rod which extends sealably through the housing,
   said elastomeric ring having an annular ridge on its inner end which protrudes from the adjacent end surfaces of the inner and outer metal rings, for sealable engagement with and disengagement from an end surface of the ram which surrounds the opening of the one passageway means into the chamber, in response to outward and inward movement of the rod, respectively,
   the inner end of said packing assembly having an annular recess which surrounds the ridge and into which a volume of elastomeric material equivalent to that of the ridge may move as the ridge is deformed upon inward movement of the rod, and
   the radially inner side of the end surface of the ridge being generally frusto-conically shaped, so that as the ridge first engages the end surface of the ram, well fluid in the chamber acts over an area subtended by the outer diameter of said surface, and then, as the pressure of the well fluid increases, over successively smaller areas.

2. A blowout preventer of the character referred to in claim 1, wherein
   the outer metal ring has an end surface opposite a confronting surface on the elastomeric ring, and
   the outer diameter of the inner metal ring has an annular flange on its inner end which has an outer surface confronting a surface on the inner end of the inner diameter of the elastomeric ring,
   whereby deformation of the elastomeric ring urges the inner ends of the metal rings towards the end surface of the ram.

3. A blowout preventer of the character referred to in claim 1, wherein
   the inner end of the elastomeric ring has another annular recess within the ridge adjacent the outer diameter of the inner metal ring.

4. Valve apparatus, comprising
   a housing having a bore therethrough and a chamber which intersects the bore,
   a closure member reciprocable within the chamber between a position opening the bore and a position closing the bore to divide it into zones above and below the closure member,
   means for so reciprocating the closure member including a rod which extends sealably through the housing into the chamber and is connected to the closure member for moving the closure member inwardly with the rod to closed position and outwardly with the rod to opened position,
   first and second passageway means for connecting the upper and lower zones of the bore, respectively, with the chamber behind the closure member when closed,
   one of the passageway means extending through the closure member,
   the connection of said closure member to its rod having lost motion, and
   the rod for said closure member having packing assembly thereon,
   inner and outer metal rings which are carried by the inner end of the rod for axial movement with respect thereto and whose inner ends protrude from the surrounding end surface of the inner end of the rod, and
   a ring of elastomeric material having its inner and outer diameters and outer end confined between said metal rings and by a recess in the inner end of the rod,
   the inner diameter of the elastomeric ring subtending an area greater than that of the portion of the rod which extends sealably through the housing, said elastomeric ring having an annular ridge on its inner end which protrudes from the adjacent end surfaces of the inner and outer metal rings for sealable engagement with and disengagement from an end surface of the closure member which surrounds the opening of the one passageway means into the chamber, in response to outward and inward movement of the rod, respectively, the inner end of said packing assembly having an annular recess which surrounds the ridge and into which a volume of elastomeric material equivalent to that of the ridge may move as the ridge is deformed upon continued movement of the end surface of the rod toward the end surface of the closure member, and the radially inner side of the end surface of the ridge being generally frusto-conically shaped, so that as the ridge first engages the end surface of the ram, well fluid in the chamber acts over an area subtended by the outer diameter of said surface, and then, as the pressure of the well fluid increases, over successively smaller areas.

5. Valve apparatus of the character referred to in claim 4, wherein the outer metal ring has an end surface opposite a confronting surface on the elastomeric ring, and the outer diameter of the inner metal ring has an annular flange on its inner end which has an outer surface opposite a confronting surface on the inner end of the inner diameter of the elastomeric ring, whereby deformation of the elastomeric ring urges the inner ends of the metal rings towards the end surface of the ram.

6. Valve apparatus of the character referred to in claim 4, wherein the inner end of the elastomeric ring has another annular recess within the ridge adjacent the outer diameter of the inner metal ring.

7. For use in valve apparatus which comprises a housing having a bore therethrough and chambers which intersect the bore, a closure member reciprocable within a chamber between a position disengageable from a ram reciprocable within another chamber for opening the bore to divide it into zones above and below the closure member, means for so reciprocating the closure member including a rod which extends sealably through the housing into the chamber and is connected to the closure member for moving the ram inwardly with the rod to closed position and outwardly with the rod to open position, and first and second passageway means for connecting the upper and lower zones of the bore, respectively, with the chamber behind the closure member when closed, and wherein one of the passageway means extends through the one closure member, and the connection of the closure member to its rod has lost motion;

a packing assembly comprising inner and outer metal rings which are adapted to be mounted on the inner end of the rod for axial movement with respect thereto and with their inner ends protruding from the surrounding end surface of the inner end of the rod, and a ring of elastomeric material having its inner and outer diameters and outer end confined between said metal rings and by a recess in the inner end of the rod, when so mounted thereon, said elastomeric ring having an annular ridge on its inner end which protrudes from the adjacent end surfaces of the inner and outer metal rings, for sealable engagement with and disengagement from an end surface of the ram which surrounds the opening of the one passageway means into the chamber, in response to outward and inward movement of the rod, respectively, the inner end of said packing assembly having an annular recess which surrounds the ridge and into which a volume of elastomeric material equivalent to that of the ridge may move as the ridge is deformed upon inward movement of the rod, and the radially inner side of the end surface of the ridge being generally frusto-conically shaped, so that as the ridge first engages the end surface of the ram, well fluid in the chamber acts over an area subtended by the outer diameter of said surface, and then, as the pressure of the well fluid increases, over successively smaller areas.

8. A packing assembly of the character referred to in claim 7, wherein the outer metal ring has an end surface opposite a confronting surface on the elastomeric ring, and the outer diameter of the inner metal ring has an annular flange on its inner end which has an outer surface confronting a surface on the inner end of the inner diameter of the elastomeric ring, whereby deformation of the elastomeric ring urges the inner ends of the metal rings towards the end surface of the ram.

9. A packing assembly of the character referred to in claim 7, wherein the inner end of the elastomeric ring has another annular recess within the ridge adjacent the outer diameter of the inner metal ring.

* * * * *